United States Patent
Rosen et al.

(10) Patent No.: US 7,702,855 B2
(45) Date of Patent: Apr. 20, 2010

(54) OPTIMIZING CACHED ACCESS TO STACK STORAGE

(75) Inventors: Jonathan Rosen, Cary, NC (US); Earl T. Cohen, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 222 days.

(21) Appl. No.: 11/202,477

(22) Filed: Aug. 11, 2005

(65) Prior Publication Data

US 2007/0038810 A1 Feb. 15, 2007

(51) Int. Cl.
*G06F 12/00* (2006.01)
(52) U.S. Cl. ............. 711/132; 711/118; 711/133; 711/141; 711/E12.02; 711/E12.022; 711/E12.069
(58) Field of Classification Search .......... None
See application file for complete search history.

(56) References Cited

U.S. PATENT DOCUMENTS 6,125,439 A * 9/2000 Tremblay et al. ........... 712/202
6,151,661 A * 11/2000 Adams et al. .............. 711/132
7,065,613 B1 * 6/2006 Flake et al. ................ 711/132

OTHER PUBLICATIONS

Tanenbaum and Woodhull, Operating Systems—Design and Implementation, 1997, Prentice-Hall, 2$^{nd}$ Edition, pp. 327-329.*

* cited by examiner

*Primary Examiner*—Reginald G Bragdon
*Assistant Examiner*—Shawn X Gu
(74) *Attorney, Agent, or Firm*—Marger Johnson & McCollom, P.C.

(57) ABSTRACT

A processing device employs a stack memory in a region of an external memory. The processing device has a stack pointer register to store a current top address for the stack memory. One of several techniques is used to determine which portion or portions of the external memory correspond to the stack region. A more efficient memory policy is implemented, whereby pushes to the stack do not have to read data from the external memory in to a cache, and whereby pops from the stack do not cause stale stack data to be written back from the cache to the external memory.

14 Claims, 4 Drawing Sheets

OPTIMIZING CACHED ACCESS TO STACK STORAGE

BACKGROUND

In one important application, stack memories provide temporary memory for procedures, also called subroutines or routines, and programs used in processing systems. Stack memories are generally 'first in last out' structures. When data A is 'pushed' or placed onto the stack and then data B is pushed onto the stack, data B must be 'popped' or removed before data A can be popped from the stack.

In the simplest model of a stack, a register referred to here as the stack pointer (SP) in the processor maintains the address of the "top" entry in the region of memory designated as the stack. In a stack that grows downwards with each push, the stack pointer is generally set to the highest address to be used for the stack at program initialization, such as 0xffffffff in a 32-bit system where 0 would be the lowest address. This implementation of a stack is only one of many possible variants and is for discussion purposes only. Embodiments of the invention may be applied to stack architectures that grow by either increasing or decreasing addresses, where the stack base is not at one end of the address space, etc.

In this discussion of a simple stack, the stack pointer is moved to a lower address dictated by the size of the item pushed onto the stack. Pushing data onto the stack causes the amount of in-use data on the stack to grow. The stack pointer moves to a higher address dictated by the size of the item popped from the stack. Popping data from the stack causes the amount of in-use data on the stack to shrink.

Items on the stack are typically referenced by an offset relative to the current stack pointer. For example, if word A and then word B are pushed, B is "at" the stack pointer having an offset of zero words. Word is A is one word prior to the stack pointer having an offset of one word. There are many other embodiments possible, such as one in which B is interpreted as having an offset of one word, and A as having an offset of two words.

Stacks typically have a word size and an alignment that are a function of the size of the general registers of the CPU. For example, an architecture that has 32-bit wide registers would preferably have 32-bit stack words.

On high-performance processors, the use of a cache often decreases the access latency for frequently-referenced regions of memory. Because of their use in holding locally-relevant temporary data, the region of external memory such as in a DRAM corresponding to the active portion of the stack often ends up residing in the cache. The active portion of the stack is the portion used by the current routine. Similarly, other portions of the stack, such as from parents of the currently-active routine, may also be in the cache until they are replaced by other, more-frequently-referenced data. Note that the external memory as referenced in the embodiments could be implemented as one or more similar or disparate types of memory. The type of external memory does not matter.

Caches typically hold blocks of memory that are a power of two in size and alignment, such as a 16-byte block aligned on a 16-byte boundary. A cache line may store a block of external memory in the cache while the contents of that block are being frequently read or written by the CPU. If the cache line is written or modified by the CPU, it is considered to be "dirty" and must be written back to the external memory when it is evicted from the cache. Otherwise the external memory would not have the latest copy of the data and the modifications to that cache line by the CPU would be lost. There are many properties of caches, such as size, degree of associativity, allocation and replacement policies, external memory writing policies, as examples, that can be varied within the scope of the embodiments.

It is possible to implement memory policies recognizing some of the special properties of stack data to determine when external memory reads and writes of stack data are not needed, and to avoid these unnecessary external memory reads and writes, increasing the overall efficiency of the system.

BRIEF DESCRIPTION OF THE DRAWINGS

Embodiments may be best understood by reading the disclosure with reference to the drawings, wherein.

DETAILED DESCRIPTION OF THE EMBODIMENTS

Figure 1:
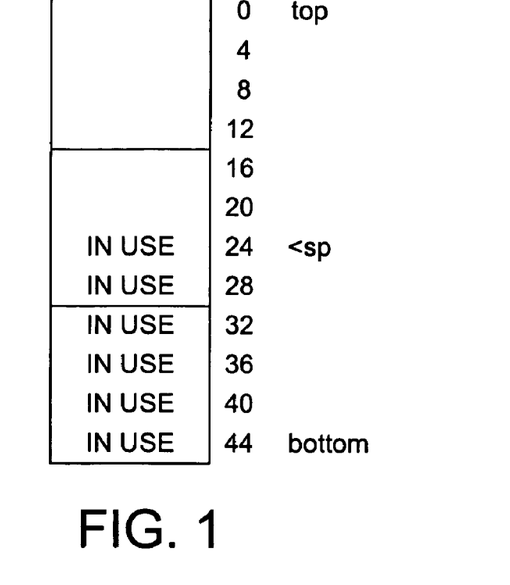
FIG. 1 shows an example of a memory stack configuration.

FIG. 1 shows an example of a simple stack having cache lines of 16 bytes and stack entries of 4 bytes. Other dimensions of the stack and differing sizes of the entries are possible and within the scope of the embodiments of the invention. No limitations to the claims should be assumed by this or any other example. The stack pointer is initialized at the 'bottom' or base address of the stack at address 44. At initialization, the first push onto the stack will move the stack pointer <sp> from 44 towards 0. In the example of FIG. 1, the current portion of the stack which is in use is from 44 through 24.

As discussed above, the allocated portion of the stack in FIG. 1 is from <sp> at 24 to the bottom of the stack at 44. The unallocated portion of the stack is from <sp−1>, or 23, to the top of the stack at 0. Again, this particular embodiment grows the stack from higher addresses to lower addresses, but this is only one possible implementation, and no limitation is intended nor should be assumed by this structure.

Code segments use stack memories for local variables and arguments during execution and may fill the stack with data from the code execution. When the stack grows into a new cache line, it crosses an alignment boundary in external memory corresponding to the size of a cache line. If the cache line is not already in the cache, a cache miss will occur. This cache miss typically results in a read of the corresponding cache line from the external memory. The read is unnecessary for stack data when the stack grows because the stack is growing to create new data, which must be written before it can be correctly read. This unnecessary read can slow down the system waiting for the read results, as well as causing an increase in the amount of bandwidth required to the external memory.

Similarly, when the stack shrinks and a related cache line of data, which may not be stack data, wishes to use the same cache location, the previously-used stack data is typically considered "dirty" or modified by the cache. As a result the data would normally be written back to external memory. But, as things are popped from the stack, the now-unused stack entries are no longer valid. For example, if a cache miss were to occur on some other piece of memory that required a cache line holding a now unused portion of the stack, the no-longer-used stack cache line will typically be written back to memory before it can be re-allocated to whichever piece of memory wants to use that cache line. This write-back is unnecessary since the now-unused stack data is no longer valid. This unnecessary write-back increases the required bandwidth to the external memory and may result in delays due to coherency interlocks and/or write pipeline limitations.

It is therefore possible to implement some memory policies for stack cache line reads and writes that eliminate these unnecessary accesses of external memory. The external memory is whatever memory is being cached as part of the stack. Embodiments of a system that may implement such memory policies are shown in FIGS. 2 and 3.

Figure 2:
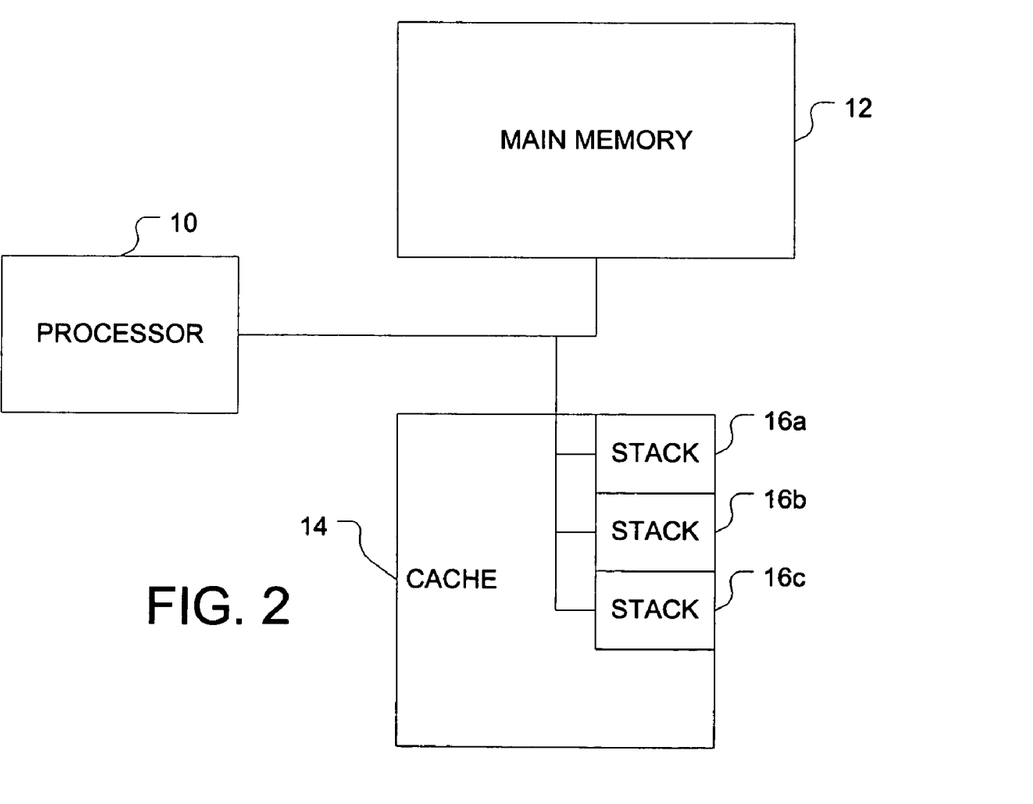
FIG. 2 shows an embodiment of a processor and memory employing a stack using a memory policy.

In FIG. 2, a processor 10 may execute instructions to perform various operations. During execution of those instructions, local code segments temporarily store arguments and values in a portion of the cache memory 14, avoiding access of the external memory 12. A portion 16 of the cache 14 is shown holding at least a portion of the stack. The cached portion of the stack is not necessarily a fixed region of the cache. Cache usage typically varies dynamically based on access frequency, and location in the cache can vary based on the address being cached. The cache 14 allows the processor to more quickly access portions of code and data that it may need frequently than if this code and data were stored in the external memory 12. In the embodiment of FIG. 2, there is one processor and a centralized cache. The cache 14 may have several stacks 16a-16c, one for each thread of execution in the processor 10.

Figure 3:
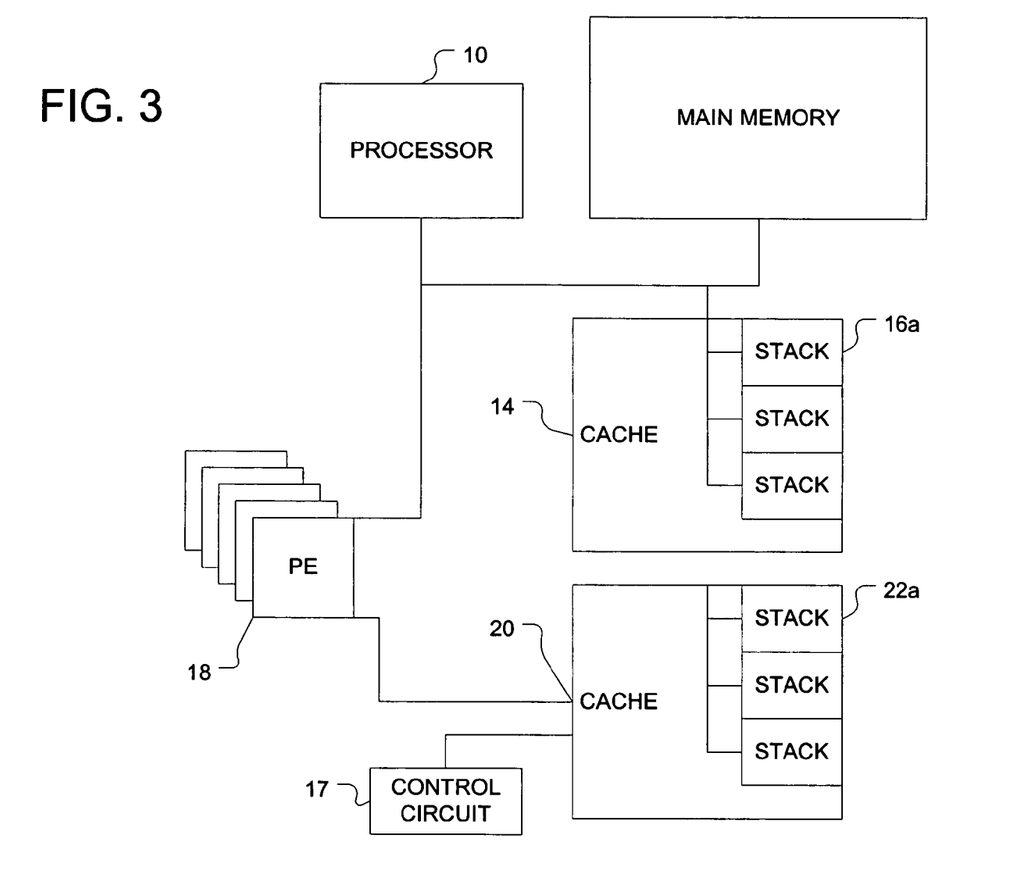
FIG. 3 shows an alternative embodiment of a processor and memory employing a stack using a memory policy.

In an alternative embodiment, shown in FIG. 3, there is a main or core processor 10 and an array of processing elements (PEs) 18. In this embodiment, each processing unit, such as the main processor and each processing element, may have its own cache and/or stack, or they may use a centralized cache and/or stack. The array of processing elements 18 may use a separate cache 20, each processing element having its own stack such as 22a, all of them sharing a stack in the cache 20 separate from the main processor cache 14, or using a centralized cache such as 14, or any combination thereof. Typically, each processing unit will have its own stack and may actually have several as discussed above.

In addition, each stack may have its own control circuit, which will be discussed in more detail below. The control circuit may reside in a particular PE, in the main processor, or there may be a separate circuit such as 17. This would also apply to the embodiment of FIG. 2. It must be noted that the circuit is shown as external to the cache, but may actually reside 'within' the cache or elsewhere in the system.

There is no limitation in the embodiments of the invention as to the configuration of the stack(s), cache(s), and processor(s), nor is there any limitation of processor(s) being single or multi-threaded in hardware and/or in software. In some embodiments, each processing unit may have multiple stacks, one for each thread of execution for that processing unit.

It is possible to implement a memory policy using an approach that allows the system to avoid unnecessary reads and writes of the external memory supporting the stack. Two things are required to fully implement such a memory policy. First, it must be clear when a memory write is to a "new" stack cache line, and does not have to be read from external memory, but can be directly allocated in the cache. Second, it must be clear when a line in the cache corresponds to "stale" data, even though it is dirty, from the stack and does not have to be written back to external memory when it is evicted from the cache.

An embodiment of an invention implementing a more efficient memory policy involves the use of a known, specified or otherwise determinable, register as the stack pointer, and a Translation Look-aside Buffer (TLB) or, equivalently, a pair of base/bound registers for the stack region of the external memory. The "known" register for the stack pointer could be provided in a number of ways, such as by actually using a fixed register, or by using special instructions when accessing the stack portion of external memory, such as a store instruction that indicates that this operation is a stack push.

The combination of the TLB and the stack pointer, or the base/bound registers with the stack pointer will be referred to here as the stack allocation indicator. As will be discussed in more detail below, the stack allocation indicator identifies the active portion of the stack.

The TLB in this embodiment would be similar to a standard TLB, but would be enhanced in some fashion to indicate which pages of memory correspond to the stack region. This could be done by a dedicated TLB entry for the stack or by attributes in each TLB entry for this purpose. Alternatively, a pair of base/bound registers could be used to indicate the region of external memory used for the stack, though this approach is less easily extensible to handle multiple stacks.

With the above, a push which allocates a new cache line can be detected because it is a write reference relative to the stack pointer at a location which has just crossed a cache line boundary. The memory policy could "trust" the stack pointer to indicate that this location is in the stack, or the TLB or base/bound registers could be used to additionally validate this. Any such detected reference can just allocate the desired cache line in the cache without actually reading it from external memory. Only the first stack write in each cache line that crosses a cache line boundary can receive this more efficient treatment, and the assumption is made that software will write to the stack in a sequential "push" fashion, as it normally would for this type of simple stack.

For example, consider what would happen after this first write to a new stack cache line if the line was evicted from the cache due to a conflict. A subsequent write to the same stack cache line could not merely allocate the cache line, as the result of the first write is now a necessary initialization value. The cache line must be re-read from the external memory in this case.

Figure 5:
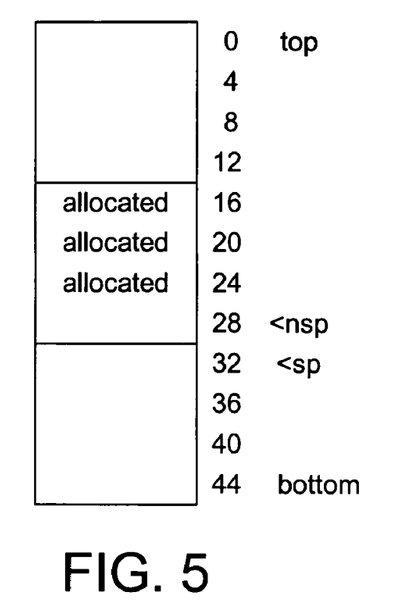
FIG. 5 shows an embodiment of a stack using a memory policy during a push operation.

This is illustrated in FIG. 5, where a push operation that grows the stack may be seen using the desired memory policy. When a push occurs that causes the stack to grow into a new cache line and the new cache line is referenced relative to the stack pointer, the cache line is 'pre-allocated' such that it is marked valid for that address. No data is read from the external memory to the cache. As can be seen in FIG. 5, prior to the push onto the stack, the stack pointer was at 32. With the push of one entry, in this case a 4-byte entry, the new stack pointer <nsp> moves to 28, and a new cache line is allocated. Rather than reading in data for the new cache line at bytes 31-16, the current entry is written to 31-28, and the entire cache line from 31-16 is merely marked as allocated and dirty. No read from the external memory is performed.

To gain efficiency when the stack later shrinks, the TLB or the base/bound registers can be used. When a line needs to be evicted from the cache because it is dirty, it can be checked to see if it is "part" of the stack, but is beyond the current stack pointer. The line is no longer in a valid region of the stack. Any line that is dirty, but which is determined to be invalid or stale stack data in this fashion does not have to be written back to external memory, but can be invalidated.

Figure 6:
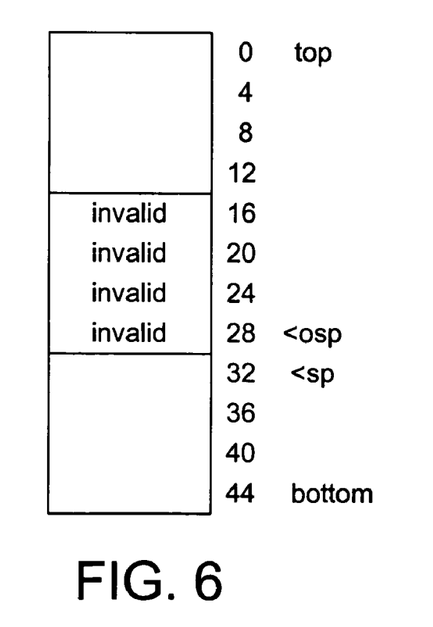
FIG. 6 shows an embodiment of a stack using a memory policy during a pop operation.

For a pop operation, as shown in FIG. 6, the entry at 28 is popped off the stack. The old stack pointer <osp> moves from 28 to 32 as the new stack pointer <sp>. The cache line at locations 31-16 is now "stale", though it is marked dirty in the cache. In one embodiment of the invention, the stack shrinking and crossing one or more cache line boundaries could directly mark those cache line(s) as "invalid" if they are currently in the cache, preventing them from later being written back to external memory. In another embodiment, a stale stack cache line would later be evicted from the cache due to its being dirty and some other external memory location needing to use that same location in the cache. This stale cache line is detected as described above and the line is invalidated, avoiding the unnecessary write to external memory.

In another embodiment, the information that a cache line is part of the stack is kept in the cache tags, eliminating the need to re-compute this information when the cache line is later evicted. This information is easily obtained from the TLB or the base/bound registers on a cache miss, since the TLB must be consulted on all memory accesses prior to carrying them out. Note that this information that a cache line is part of the stack is necessary in order to implement the desired memory policy, but it is not sufficient. Whether the cache line is stale by virtue of being past the current end of the stack must also be determined.

The above embodiments of this invention have been described with reference to a simple model of a stack, where the stack pointer is always the "top" (end) of the stack. Most modern systems, however, do not implement stacks in this simple fashion. Instead, the stack pointer is used as a pointer to the current "frame." This embodiment of a stack pointer points to the beginning of the arguments and temporary variables for the current routine, including space for saved registers and the previous frame pointer. This embodiment of the stack pointer may be referred to here as the current frame pointer. In this embodiment, the stack allocation indicator would be comprised of the current frame pointer and an end pointer.

With a stack implemented in this fashion, writes occur "off the end" of the stack and this is where the current frame is stored. Only when another routine is called does the current frame pointer move to the end of the current frame, leaving it placed for the next routine's arguments and temporary variables. Many variations of this concept are possible, such as whether arguments to a routine or saved registers go before or after the stack pointer, whether there is a separate, traditional (top of) stack pointer in addition to the frame pointer, etc.

Figure 4:
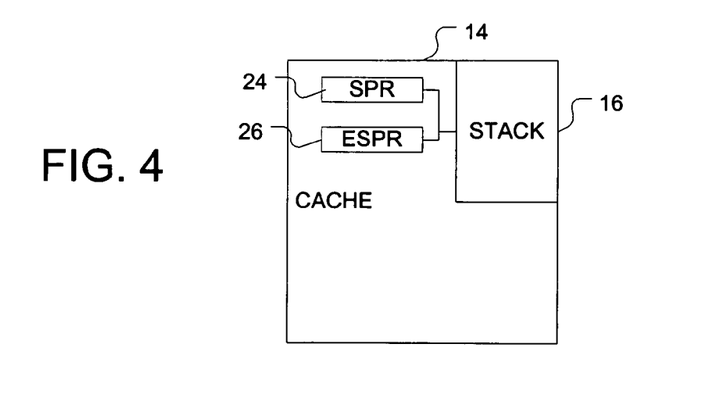
FIG. 4 shows an embodiment of a stack implementation in a cache memory capable of employing a memory policy.

This more modern stack architecture gives rise to another embodiment of this invention that avoids the use of the TLB or the base/bound registers, and instead uses an additional pointer to track the region of memory being used for the stack. An implementation of a stack in a cache memory according to this embodiment is shown in FIG. 4. The cache memory 14 has a stack 16 and two stack registers. The first register is the stack pointer register (SPR) 24, which in this embodiment is the current frame pointer, the contents of which are the current value of the stack pointer, or the "top" of the stack from a programming perspective. In this embodiment of a 'modern' stack, the stack pointer is not the same as the last valid location on the stack.

The second register is the end of stack pointer register (ESPR) 26, in which the location of the current end or last valid location, as distinguished from the top, of the stack is stored. The stack pointer register 24 points to the current routine's calling frame on the stack, but does not indicate how far into the stack beyond that point the current routine is using. Being able to track how much of the stack beyond the stack pointer the current routine is using, via the ESP register, allows for implementation of the desired memory policy.

In this embodiment, the bounds of the stack are tracked via the ESP register. The ESP Register will always point to the end of the portion of the stack that is in use. In this fashion, the ESP register acts as a pointer to the true "top" of the stack, similar to the stack pointer in the simple stack implementation. This leads to embodiments similar to those of the simple stack, using the ESP and a TLB or base/bound registers to indicate which locations are part of the stack. Other embodiments take advantage of the existence of the SP and ESP and the semantics of the calling sequences used with the modern stack to simplify the implementation, and to eliminate some software restrictions described previously.

Updates to the end of stack pointer register may occur as a result of updates to the stack pointer register as well as any memory references beyond the stack pointer into the portion of the stack previously considered as not in use. Updates to the stack pointer register may occur in the form of a call or an entry instruction in which the first instruction of a called routine sets up its stack/current frame pointer, or in the form of a return or exit instruction which removes or pops the current frame and returns to the parent frame. In various embodiments, either the call or the return instruction might be implemented as a single instruction, or as a sequence of instructions, and the updates to the stack/current frame pointer might be explicit, or might be actions or side effects of the call or the return instruction's execution.

In the case of a growing downwards stack shown in FIG. 5, writes off the end of the stack, similar to pushes, update the end of stack pointer such that the new end of stack pointer always points to the furthest active word on the stack, in this example the lowest in address. This ensures that the end of stack pointer refers to the "end" of the stack. This removes a software restriction described previously which required sequential accesses for "pushes." Since the end of stack pointer register will always point to the furthest out data referenced on the stack, there is no danger of incorrect behavior from non-sequential writes to the stack. The only consequence of non-sequential writes is a potential loss in efficiency, since only writes which cause the end of stack pointer to cross a cache line boundary can use the new memory policy and allocate the cache line, rather than read it from external memory.

For example, consider a write to the stack that was 64 bytes or four cache lines past the current "end". The line that was written can clearly use the new memory policy, and this write would move the end of stack pointer register to this furtherout location. But the intermediate lines, whose writes were skipped, are now "below" the end of stack pointer, and later initialization writes to those locations cannot use the new memory policy.

The end of stack pointer register is also updated when the stack pointer register is updated. If the stack is growing, the end of stack pointer register will point to the end of the stack, as discussed above. In some embodiments, if a call instruction advances the stack pointer as part of storing data onto the stack, the end of stack pointer must be updated as well. The end of stack pointer should never point to a location on the stack prior to the stack pointer. Hence in some embodiments, when the stack pointer moves, the end of stack pointer is set in the case of a downward-growing stack to the minimum of the stack pointer and the end of stack pointer.

If the stack is shrinking, as when a routine returns and its frame is popped from the stack, the stack pointer is getting bigger in the example of a stack which grows downwards. The end of stack pointer register will be set to the old stack pointer, which in a downward growing stack is the larger value. This reflects the fact that the previous routine has returned to its parent, and the locations it was using on the stack are no longer valid. In other words, the end of stack pointer is left pointing to the last valid location on the stack.

In some embodiments, for example where arguments are stored on the stack prior to the stack/current frame pointer, the end of stack pointer may need to be set to a location offset from the stack pointer to reflect the fact that the arguments to the just-returned routine are no longer valid.

Figure 7:
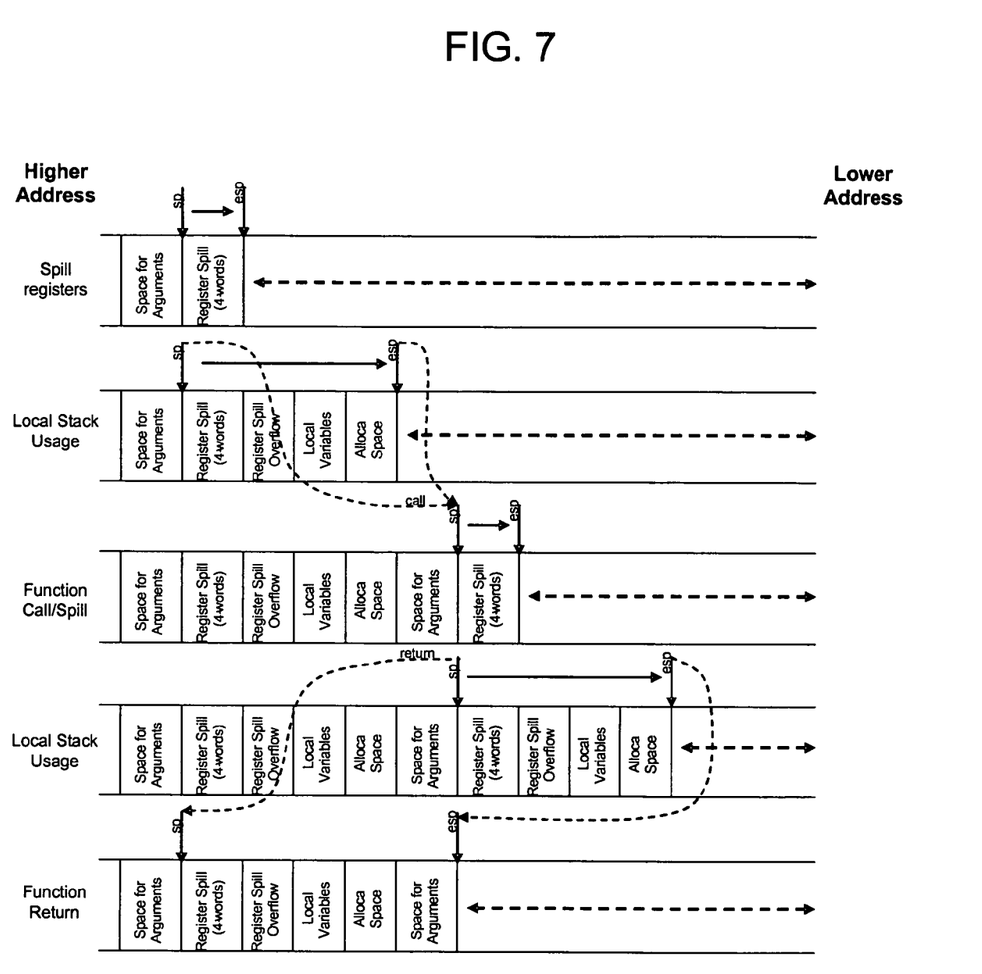
FIG. 7 shows an embodiment of a flow of data through a stack during operation.

Implementation of the desired memory policy in this embodiment may be better understood with regard to FIG. 7.

At the top of FIG. 7, a routine has just been entered, and the caller has moved the stack pointer to the end of the space for arguments for the newly-entered routine. A register spill (save) area has been written as the initial process of the newly entered routine, and the writes beyond the stack pointer at the base of the current frame have caused ESP to move to the end of this area. No fetch from memory will be performed to fill the space between the stack pointer and the end of stack pointer as this is detected as newly-allocated memory seen to be part of the current frame. As in the simple stack embodiment, however, only a write which crosses a cache line boundary should employ this more efficient memory policy. Writes to the middle of a cache line at or below ESP that miss in the cache would assume that the desired stack cache line was previously written but had been evicted from the cache.

In the second line of FIG. 7, the newly-entered routine has made more memory writes for spill register overflow, local variables, etc. These writes will also not fetch fresh cache lines from memory, but will allocate cache lines as needed, since they are also detected to be newly-written data for the current frame. When another level of routine is called at the third line, the stack pointer moves to the end of the current frame and the end of stack pointer moves as registers are saved to the spill area. Without a spill area, the stack pointer and the end of stack pointer would point to the same space in the stack at this point.

The fourth line of the figure is basically the same as the second line, just at a different portion of the stack at one level deeper in routine calling. In the fifth and bottom line, the routine returns, causing ESP to move to the old SP, and SP to move back one frame as the frame used for the returning routine has been popped from the stack. The region of memory beyond ESP is now known to be unused, and does not have to be written back if evicted from the cache to make room for a different cache line of data. It is still necessary to know that locations "beyond" ESP are part of the stack, and are not used for other purposes.

As in the simple stack embodiment, a TLB or base/bounds registers could be used to identify the stack region of the external memory for this purpose. Another embodiment assumes that any reference within some small distance, for example 64K bytes, of ESP is part of the stack.

In this manner, a memory policy can be implemented to avoid unnecessary external memory reads and writes. The memory policy is applied for regions of the stack relative to the current frame in the case of pushes, and to the previous frame in the case of pops. The memory policy may be implemented as part of the control circuit 17, shown in FIG. 3, or it may be implemented in software.

The circuit 17 shown in FIG. 3 may actually be multiple circuits, such as one to allocate cache lines in the stack memory without reading them when an address referenced is in a cache line outside the active portion of the stack memory, and a second circuit to implement an additional cache memory policy, the circuit invalidating the cache line to be evicted without writing it back to the stack memory. These circuits may all be contained in one region, in which case the control circuit 17 could be a control circuit region containing the multiple circuits.

A software implementation of the memory policy could use additional instructions on each stack push to decide if a cache line boundary was being crossed, and to allocate that line in the cache using a special cache-manipulation instruction, rather than just writing to that line and causing an unnecessary external memory read. Similarly, a software implementation could, prior to each return from a routine, use special cache-manipulation instructions to invalidate the lines in the cache corresponding to the current, about-to-be-discarded frame.

Although there has been described to this point a few particular embodiments for a method and apparatus for stack cache allocation and management for more efficient operation, it is not intended that such specific references be considered as limitations upon the scope of this invention except in-so-far as set forth in the following claims.

What is claimed is:

1. A device, comprising:
   a stack memory;
   a stack allocation indicator including an end of stack pointer to identify an active portion of the stack memory, the end of stack pointer indicating furthest data of the active portion of the stack memory;
   a cache memory to cache at least a portion of the stack memory; and
   a circuit to implement a cache memory policy for the stack memory, the circuit to allocate a cache line for the stack memory in the cache memory without reading a corresponding portion of the stack memory when an address referenced is outside the active portion of the stack memory, to invalidate a cache line that was caching a previously active portion of the stack memory but now resides in a region beyond the active portion of the stack memory, and to allocate a cache line for the stack memory in the cache memory and read a corresponding portion of the stack memory when an address referenced is within the active region of the stack memory and was not allocated a cache line when the end of stack pointer was moved.

2. The device of claim 1, the circuit further comprising a circuit to set an end of stack pointer register to whichever one of the end of stack pointer and an address referenced is further in the stack memory.

3. The device of claim 1, the circuit further comprising a circuit to determine if a cache line that misses in the cache memory is caching part of the stack memory.

4. The device of claim 1, the circuit further to invalidate the cache line that was caching the previously active portion of the stack memory but now resides in the region beyond the active portion of the stack memory without writing the invalid cache line back to the stack memory.

5. The device of claim 4, the circuit further to detect if the cache line that was caching the previously active portion of the stack memory but now resides in the region beyond the active portion of the stack memory is part of the stack memory using a translation look aside buffer containing stack page indications.

6. The device of claim 4, the circuit further to detect if the cache line that was caching the previously active portion of the stack memory but now resides in the region beyond the active portion of the stack memory is part of the stack memory using a pair of base/bound registers that identify the stack memory in an external memory.

7. The device of claim 4, the circuit further to detect if the cache line that was caching the previously active portion of the stack memory but now resides in the region beyond the active portion of the stack memory was part of the stack memory if the address of the cache line is within a fixed offset of an end of stack pointer.

8. The device of claim 1, the stack allocation indicator including a current frame pointer configured to point to a beginning of arguments and temporary variables for a current routine stored in at least one of the stack memory and the cache memory caching the stack memory, the arguments and temporary variables including a space for saved registers and a previous frame pointer.

9. The device of claim 1, the circuit is further to invalidate the cache line that was caching the previously active portion of the stack memory but now resides in the region beyond the active portion of the stack memory by setting a valid flag to invalid.

10. The device of claim 1, the circuit is further to invalidate the cache line that was caching the previously active portion of the stack memory but now resides in the region beyond the active portion of the stack memory when a pop operation causes the stack allocation indicator to cross a cache line boundary.

11. A method, comprising:
identifying an active portion of a stack memory;
allocating a new cache line in a cache memory for the stack memory such that no data is read into the new cache line when an address referenced is outside the active portion of the stack memory;
invalidating a cache line that was previously part of the active portion of the stack memory but now resides in a region beyond the active portion of the stack memory; and
allocating a new cache line in the cache memory for the stack memory such that data is read into the new cache line when an address referenced is within the active region of the stack memory and was not allocated a cache line when an end of stack pointer was moved.

12. The method of claim 11, the method further comprising determining if a cache line that misses in the cache memory is part of the stack memory.

13. The method of claim 11, the method further comprising determining if a cache line to be evicted from the cache memory was caching a previously active portion of the stack memory but now resides in a region beyond the active portion of the stack memory.

14. The method of claim 13, the method further to invalidate the cache line to be evicted without writing the cache line to be evicted back to the stack memory.

* * * * *

UNITED STATES PATENT AND TRADEMARK OFFICE
CERTIFICATE OF CORRECTION

| | | |
|---|---|---|
| PATENT NO. | : 7,702,855 B2 | Page 1 of 1 |
| APPLICATION NO. | : 11/202477 | |
| DATED | : April 20, 2010 | |
| INVENTOR(S) | : Jonathan Rosen et al. | |

It is certified that error appears in the above-identified patent and that said Letters Patent is hereby corrected as shown below:

Column 8, line 58, the word "invalid" should read -- invalided --.

Signed and Sealed this
Twenty-eighth Day of February, 2012

David J. Kappos
*Director of the United States Patent and Trademark Office*